US007930413B2

(12) United States Patent
Peddemors et al.

(10) Patent No.: US 7,930,413 B2
(45) Date of Patent: Apr. 19, 2011

(54) SYSTEM AND METHOD FOR CONTROLLING ACCESS TO A NETWORK RESOURCE

(75) Inventors: Michael Peddemors, Surrey (CA); Josh Wilsdon, Surrey (CA)

(73) Assignee: Wizard Tower Techno Services Ltd., Surrey, British Columbia (CA)

( * ) Notice: Subject to any disclaimer, the term of this patent is extended or adjusted under 35 U.S.C. 154(b) by 1017 days.

(21) Appl. No.: 11/217,329

(22) Filed: Sep. 2, 2005

(65) Prior Publication Data

US 2006/0080444 A1  Apr. 13, 2006

Related U.S. Application Data

(60) Provisional application No. 60/606,877, filed on Sep. 3, 2004.

(51) Int. Cl.
*G06F 15/16* (2006.01)
(52) U.S. Cl. ......... 709/229; 709/206; 709/226; 709/227
(58) Field of Classification Search ................ 709/206
See application file for complete search history.

(56) References Cited

U.S. PATENT DOCUMENTS

| | | | | |
|---|---|---|---|---|
| 5,999,967 A | * | 12/1999 | Sundsted | 709/206 |
| 7,606,905 B1 | * | 10/2009 | Atluri et al. | 709/226 |
| 2002/0029304 A1 | * | 3/2002 | Reynar et al. | 709/332 |
| 2003/0109248 A1 | * | 6/2003 | Lewis | 455/412 |
| 2004/0030800 A1 | * | 2/2004 | Gray et al. | 709/238 |
| 2004/0049580 A1 | * | 3/2004 | Boyd et al. | 709/226 |
| 2005/0114393 A1 | * | 5/2005 | Wilson | 707/104.1 |

* cited by examiner

Primary Examiner — Jeffrey Pwu
Assistant Examiner — Sulaiman Nooristany
(74) Attorney, Agent, or Firm — Klarquist Sparkman, LLP

(57) ABSTRACT

A method and system that identifies connection attempts to a resource through the IP address used in the connection and compares the IP address against one or more of single or multiple lists of IP addresses simultaneously to affect the connection process. The result of the comparison against the list is used to either block or allow access to the resource or to perform some other action based on the presence of the connecting IP Address on said list(s). The lists are retrieved in native format from one or more sources and compiled into a format allowing high speed comparisons or lookups against the list. The lists may be blacklists containing known addresses that have performed offensive actions or whitelists containing known safe or vetted IP addresses, or other lists used to determine the course of intended action. This extends to the ability to efficiently test for the presence of an IP address against the large numbers that may occur in such a locally available list(s), where the actions to be performed, based on the presence of an address on such a list can be determined based on the recipient, additional classes or characteristics of the sender, and/or class of the destination resource to which the connection is made.

5 Claims, 4 Drawing Sheets

SYSTEM AND METHOD FOR CONTROLLING ACCESS TO A NETWORK RESOURCE

PRIOR APPLICATIONS

The present invention claims the benefit of U.S. provisional application No. 60/606,877 filed Sep. 3, 2004 incorporated herein by reference in its entirety.

BACKGROUND OF THE INVENTION

1. Field of the Invention

The invention relates to the field of transferring data between computers using network resources and more particularly to controlling access to the network resources.

2. Relevant Background

Many internet service providers (isps) use blacklists to control access to their servers and services. Rbl (realtime blackhole list) is a list of ip adresses whose owners refuse to stop the proliferation of http://www.webopedia.com/term/r/spam.htm spam. The rbl usually lists server ip addresses from isps whose customers are responsible for the spam and from isps whose servers are hijacked for spam relay.

As subscribers to the rbl, isps and companies will know from which ip addresses to block traffic. This type of traffic blocking occurs prior to the smtp (simple mail transfer protocol,) connection phase. The receiving end will check the rbl for the connecting ip address. If the ip address matches one on the list, then the connection gets dropped before accepting any traffic from the connecting client. Some isps though will choose to blackhole (or ignore) ip packets at their routers. The goal here is to block all ip traffic from clients on the rbl blacklists.

It is important to note that the recipient end, not the rbl administrator, does all e-mail and packet blocking which may choose to honour lists that indicate spam may be directed at its servers.

Mail abuse prevention system (maps) 11c created the rbl, but there are other entities that keep rbls aside from maps.

Blacklists are provided by a variety of sources, and may be used to control many different types of services, including but not limited to websites, data servers, games servers, instant messaging systems, voice over internet protocol (voip) phones and electronic mail services. The reasons for a particular ip address being on a blacklist are arbitrarily set by whoever controls the rbl service. A typical reason may be that the address has previously been reported for an action that has been deemed offensive, i.e. An attempt to illegitimately access a service (hacking) or the address being identified as a source of spam email. Many service providers regard the ability to block known offenders as crucial for effective operation of their services.

The ability to determine the ip address that the reported offender is coming from can occur at several levels. It can happen at the operating system or kernel level, for example in linux this can be controlled at the 'iptables' level, or it can happen via a tcp connection server wrapper, ie via 'tcpserver' or 'xinetd' before it is passed on to the application service, or it can happen at the service level, i.e. The webserver, dns or smtpd process.

There are several limitations related to the current usage of rbl's. Typically, rbl lists are polled by a lookup program run by the isp to determine whether a specific ip address is listed. The rbl may be maintained at remote offsite locations and may be queried via a udp/ip or tcp/ip type connection to the rbl.

One limitation id due to the format of an ip address, which is a 32-bit numeric address written as four numbers separated by periods. Each number can be zero to 255. For example, 1.163.15.240. Due to the size of the ip address space blacklists are often too big for efficient local storage (256×256×256×256 addresses for ipv4 (ip version 4) and even more so for ipv6 (ip version 6) adresses. Furthermore, disseminating these lists from their collection points across networks or internets becomes onerous and bandwidth intensive and many services that need access control the most, don't have the ability to collect and/or store these lists.

Compilation services offer a central database of address. most blacklists are typically accessed via a live lookup against these central databases of addresses. this means that the rbl dns service is accessed for every connection initiation attempt by a user. There are numerous rbl services, some that may be accessed free and some that charge for access. examples of well known compilation services may be accessed at the following url's.

http://www.spews.org
http://www.spamcop.net
http://www.spambag.org
http://www.ordb.org The use of these rbl database services has not been without problems. Because the dns/rbl database is queried for each user connection connectivity problems or network slowdowns can cause lookups to timeout and/or fail. Some rbl services have also incurred malicious denial of service (dos) attacks from hackers, preventing legitimate lookups for a period of time. Additionally when an rbl service goes offline, it may be that all incoming addresses could be rejected, causing an embarrassing or costly interruption of service. Legal challenges to rbl services have also been launched and in some cases it has been mandated that there must be an ability to override a blacklist entry. Most rbl systems do not have a contingency for overriding entries.

Another problem is that due to the lookup process it is not practical to access several rbl lists for each user connection. It would be highly desirable to be able to query multiple lists for each connection to ensure the broadest possible protection, since rbl providers may use very different inclusion criteria.

Additionally since blacklists from different providers are formatted differently, the lookup process may have to be individually customized for each provider further complicating the lookup process.

On average, a lookup using a commercial rbl system can take up to approximately 1-3 seconds or even longer, depending on network latency, which in the example of a commercial mail server processing over 1 million connections per day, is very inefficient. A common mail server has in the range of 200-400 simultaneous connections making it imperative that each connection occupies the minimum amount of time. Any type of network request for a lookup can result in serious delays. A remote rbl lookup to a database may encounter rbl service delays due to loading that could prevent the lookup from completing.

There remains a need for an rbl lookup process that mitigates at least some of the aforementioned problems.

SUMMARY OF THE INVENTION

An advantage of the present invention is that it provides an efficient and viable validation of ip addresses on a per user basis.

Another advantage of the present invention is that it provides a mechanism to aggregate several rbl lists that allows for efficient searching.

A further advantage of the compact format used by the present invention for storing rbl data is that it allows easy dissemination across a network or storage of the compiled list locally.

A still further advantage of the rbl list of the present invention is that it allows easy searching of multiple lists, each with differing list inclusion criteria.

Accordingly, in a first aspect of the invention there is provided a method for controlling access to a network resource by a user, the method comprising reviewing at least one incoming electronic message directed to the network resource; extracting a network address from the incoming electronic message; performing a lookup of the extracted network address against a locally stored list of network addresses, the locally stored list of network address having a data structure for efficient lookup, and being generated by converting one or more obtained blacklists of network adresses to said data structure; and performing one or more operations on said incoming address based on whether said incoming address is contained in said locally stored list.

In another aspect the present invention provides a method for generating a master list of ip addresses for governing access to a network resource. A plurality of lists of ip addresses are received, the lists providing an indication of the status of the ip addresses listed thereon. The indicated status is interpreted to determine whether ip addresses on the list should be included on the master list of ip addresses. The status is stored for each ip address in the master list.

Another aspect of the invention provides a computer program product in a computer-readable medium for use in a data processing system for storing a plurality of ip addresses. The computer program product has first instructions for receiving a plurality of ip addresses and second instructions for merging the ip addresses into a master list. Third instructions are provided for storing the master list on a computer-readable medium.

In yet another aspect of the invention, there is provided a system for enabling access to a network resource by a user, wherein the system includes a mastering server designed for receiving a plurality of lists of ip addresses from a variety of sources. The lists provide an indication of the status of the ip addresses listed thereon. A data structure is held in a computer readable medium for storing the status of the ip addresses. A master list server is configured to receive and store a copy of the data structure. The master list server is further configured to provide access to the data structure by the network resource in order to determine whether the user should be allowed access to the network resource.

Advantageously lookups may continue to occur when connection is down since the last verified compiled list (containing data comparable to the original rbl lists from which it was generated) is always available even when there is a connection problem. Once the connection to the rbl source is re-established updates may proceed at normal frequency. Furthermore there is ability to handle many formats of lists and to call lookups from many levels, services, and applications. Where multiple lists are used, the system advantageously allows the ability to report on which lists hits occur. The system is also easy to scale to the use of hundreds or more rbl lists. The system also minimizes the bandwidth required for such dissemination and allows easy replication of lists over a network.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

For an understanding of the invention, reference will now be made by way of example to a following detailed description in conjunction with the accompanying drawings.

Figure 1:
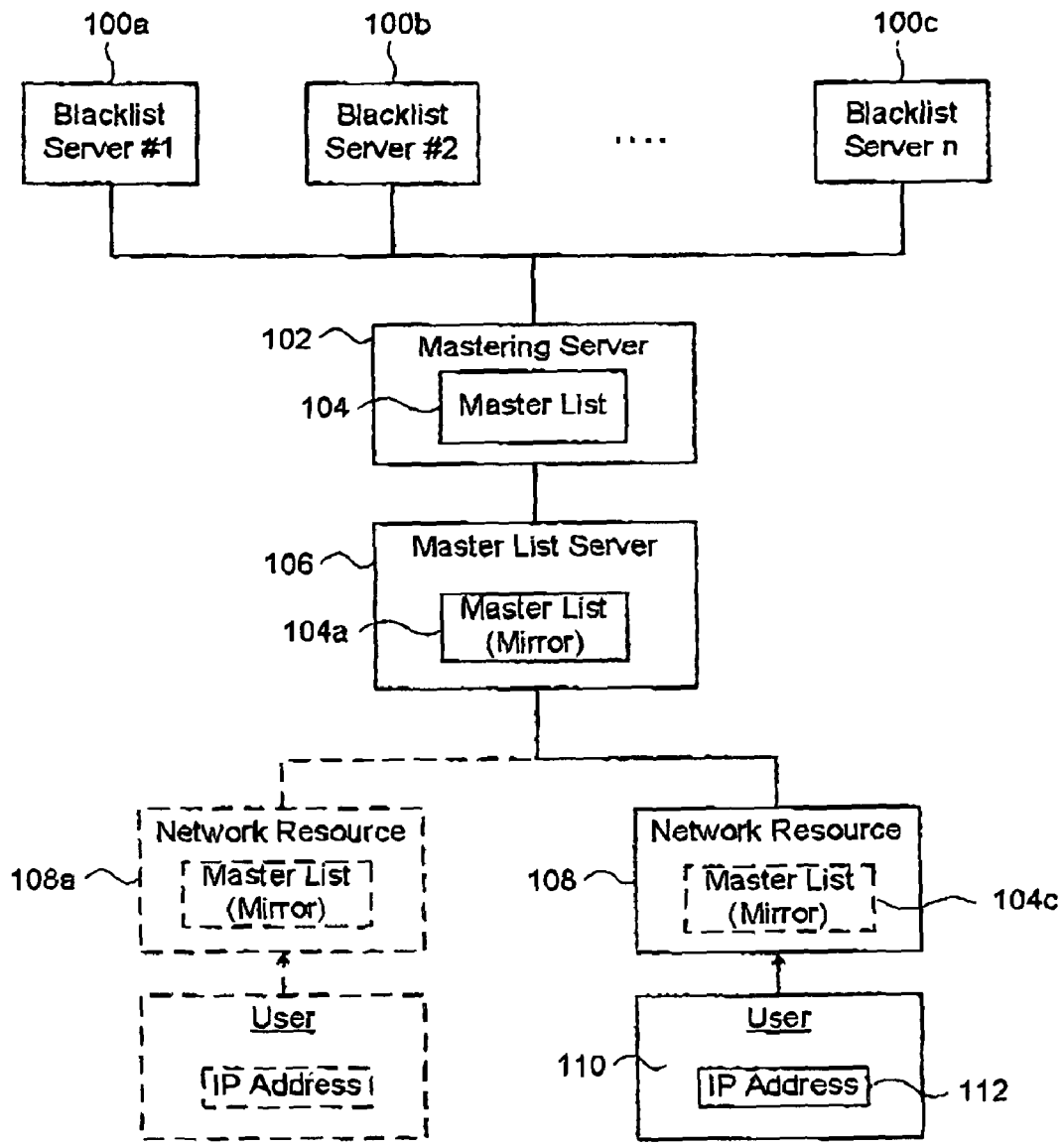
FIG. 1 is a block diagram of an embodiment of the invention.

An embodiment of the present invention is shown in FIG. 1. Blacklists are provided on a variety of remote servers 100*a*, 100*b* and 100*c*. A mastering server 102 connects to blacklist servers 100*a*, 100*b* and 100*c* using a network transfer protocol such as ftp, http or rsync. The rsync protocol is particularly advantageous because it provides fast incremental file transfer and is available as an open source utility. Mastering server 102 has disk and/or memory resources for storing a master list 104 on the mastering server 102. The mastering server 102 is connected to a master list server 106, or plurality of master list servers (only one is shown). The master list server 106 also has resources for storing a mirrored copy of the master list 104*a*. A network resource 108 that allows connections by users is able to connect to master list server 106 to perform a local lookup of list 104*a*. Alternatively the network resource 108 may provide local resources for storing a copy of master list 104*c*. A user 110 with an ip address 112 connects to network resource 108 for the purpose of gaining access to the network resource 108. Other network resources 108*a*, having users may likewise connect to server 106 to access master list 104*a*. In general the system may be expanded to a plurality of master list servers each having a plurality of network resources accessing the master list with the network resources running on the same or different servers.

The operation of the system shown in FIG. 1 will now be explained with reference to FIG. 1 and the process flowchart of FIG. 2. At step 200 a perl script is used to download blacklists in their native format from a selected plurality of rbl sources. The perl script further implements a list specific query frequency at step 202. The advantage of a list specific query frequency is that the query can be performed commensurate with a known update frequency of a specific list or limitations placed by the blacklist provider on query frequency. The perl script is also configured to handle failed connections to blacklists. Since there is always a possibility that an update may fail, the script only replaces the last master list once the download has completed and the update data has been verified. In this manner, even if a download fails, a valid master list is still available for use until it can be updated.

At step 204 the downloaded lists are stored on mastering server 102 in their native format. The native format generally differs between different blacklist sources. One example of a native format file may be obtained by inputting the following address into a internet browser: http://www.spews.org/spews list level1.txt. This results in the following output format:

about.spews in TXT "This zone is maintained by spews.org"

61.153.120.0/24 ! [1] 1CHN1XIN, see http://spews.org/ask.cgi?S460

61,153.123.0/24 ! [1]1CHN1XIN, see http://spews.org/ask.cgi?S460

61.129.67.0/24 ! [1] 1CHN1XIN, see http://spews.org/ask.cgi?S460 etc, etc

Aside from the first informational line, each line indicates either a distinct ip address, or an ip address block, (range of addresses). In this example the address range is indicated in cidr format (classless inter-domain routing), wherein number following the "/" indicates the prefix length. For this specific rbl list ranges are used to reduce the amount of storage required for the records. Another example of a blacklist format from http://cbl.abuseat.org is shown below:

:127.0.0.2: Blocked—see http://cbl.abuseat.org/lookup.cgi?ip=$
$TTL 3600
12.1.213.125
12.1.231.163

For this provider only individual ip addresses and not ranges are used, making the file size significantly larger (approximately 20 mbyte compared to 2 mbyte for the spews.org list).

Other blacklist sources vary in how difficult the interpretation of entries is and in the size of the lists. Inclusion on a blacklist generally indicates that the ip address has been associated with offensive activity but this is not mandated and the blacklists could equally well list non-offensive addresses (a so-called "whitelist"). Such variations between lists complicate lookups and particularly lookups from multiple lists. While the blacklists may be from remote sources they may come from any source, including local and remote databases, standard files, logfiles, etc. In this context a blacklist is any source of addresses to be used for any type of conditional processing. Advantageously, the lists are either retrieved in a compressed format using utilities such as rsync or the lists are stored in a compressed format on the server 102.

At step 206 the multiple stored native format files are converted into a single transitional data structure containing all list entries. In one embodiment the transitional data structure is a binary file having a bitfield represenation of every ip address in the address space (ipv4 or ipv6 or any other address space). A bitfield value of "1" indicates that the corresponding address is listed while a bitfield of "0" indicates that it is not listed. The file size is a fixed 512 mbyte in size for ipv4 address space regardless of the number of lists that are represented although information concerning the actual blacklist source for a particular address is not maintained. Since each address uniquely maps to a bitfield location in the file it is extremely simple to load data into this format and also extremely simple to perform a lookup on any address. Advantageously the file may be initialized as a transitional structure in memory while processing the native format lists and then written out to disk in a further step 208. Due to the binary format and the inevitable large number of bits set to "0" the file will compress well and may be stored in a compressed format in step 208 thus saving disk space.

At step 210 the list is disseminated to various master list servers 106 and/or network resources 108 as required. The ip address of a user, attempting to connect to a network resource is looked up in the master list copy and accordingly allowed or denied access based on the value of the bit corresponding to their address. In the case of email, this may result in an email communication being rejected by a network mail server. Note that, since blacklists are continually updated it is important that process steps 204 to 210 be repeated at some time interval so that new blacklists downloaded after list specific time delay 202, are processed into master lists at some reasonable frequency. This allows the network resource to always be working off an updated master list.

Figure 2:
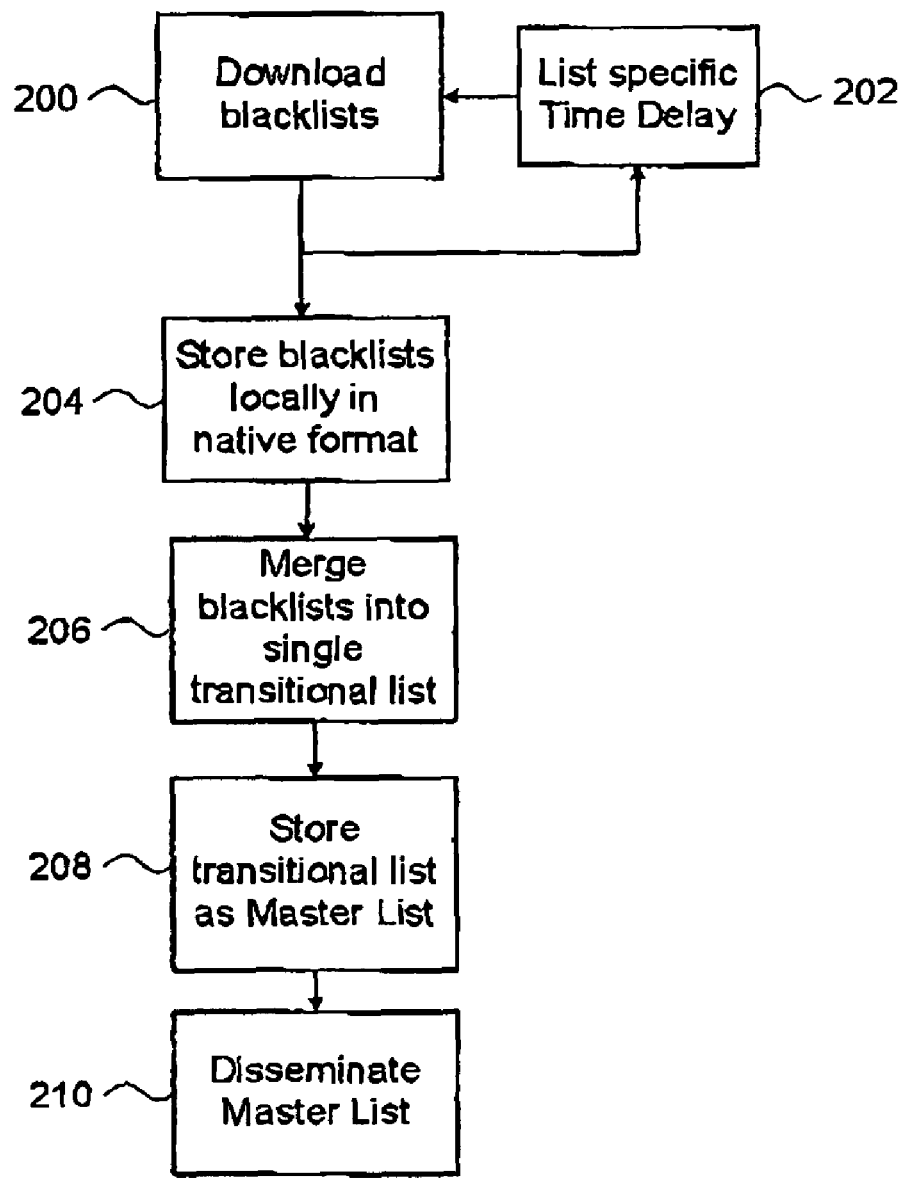
FIG. 2 is a process flowchart depicting a set of process steps in an embodiment of the invention.

The embodiment depicted in FIG. 2 is advantageous in its simplicity and in allowing very fast lookup of any ip address. However this format is not easily adapted to also store information relating to which blacklist sources had included a particular address on their blacklists. While an identical 512 mbyte binary file may be created for each blacklist source to preserve this information, the overall file size may become prohibitive when many blacklist sources will be used.

Figure 3:
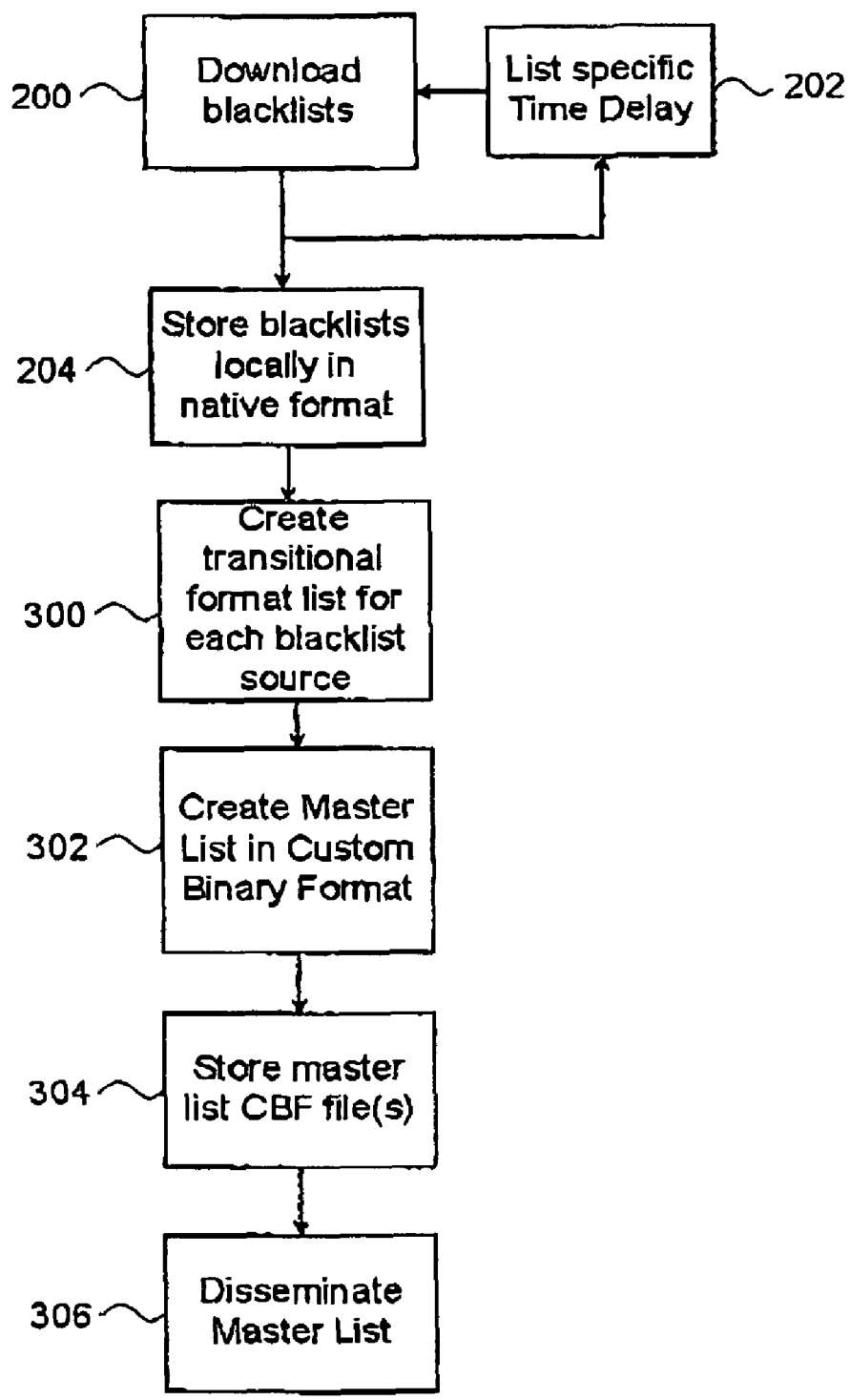
FIG. 3 is a process flowchart depicting a set of process steps in an alternative embodiment of the invention.
Figure 5:
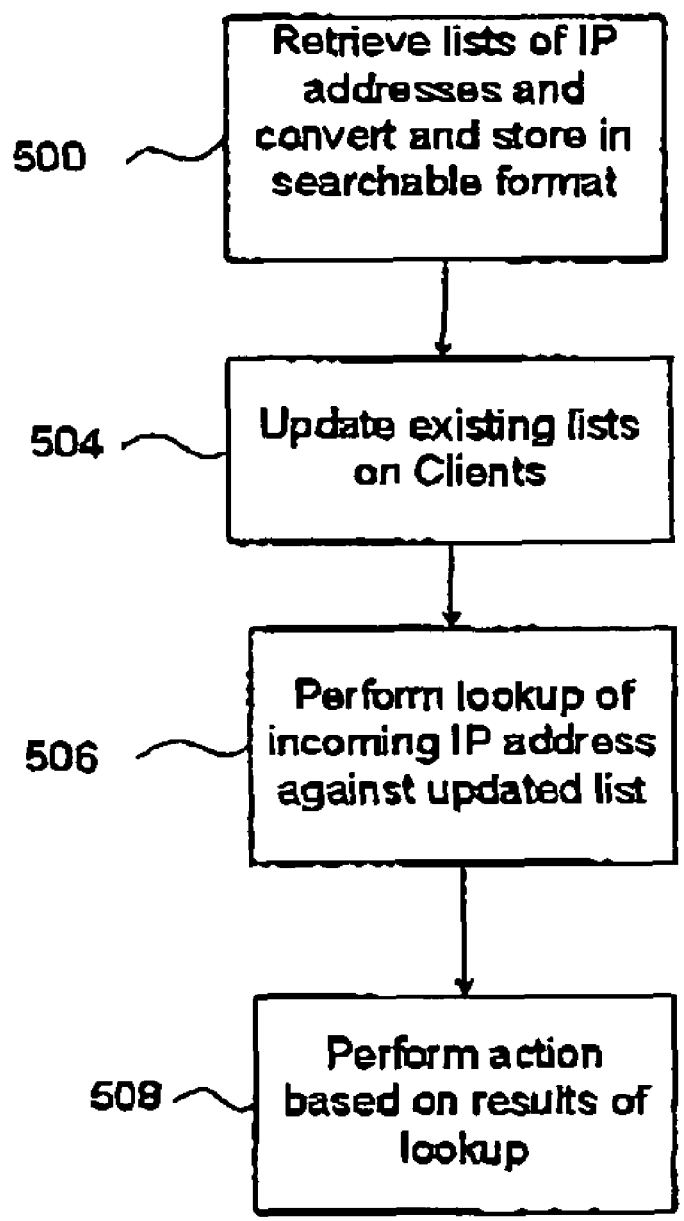
FIG. 5 is a process flowchart showing a method for controlling access to a network resource.

In an alternative embodiment shown in FIG. 3, the process is identical to that shown in FIG. 2 up to and including step 204. However, at step 300 a 512 mbyte transitional binary format file is created for each blacklist source to be processed. The transitional files are then processed to generate a more efficient custom binary format (cbf) master list at step 302. The cbf files may be stored separately or as a composite master list file at step 304. At step 306 the master list files are disseminated to various master list servers 106 and/or network resources 108 as required.

Figure 4:
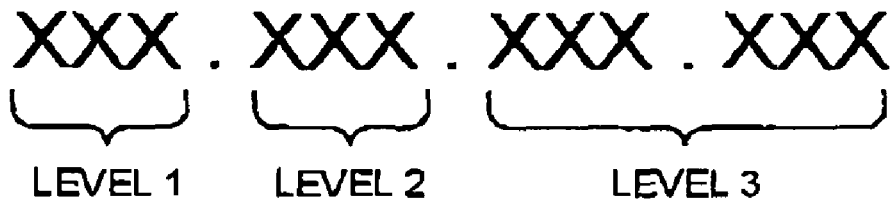
FIG. 4 is a depiction of an ipv4 address.

A description of one possible format for the cbf file follows. An ipv4 address is a 4-byte (32 bit) number which is often represented as four octets, each having one of 256 possible values. The address is often written in a dotted octet form e.g 238.223.156.208 The first octet ("238" in this case) is the most significant part of the address with successive octets being of diminishing significance. For example 238.223.156.208 and 238.223.156.209 would typically represent two computers on the same subnet within a single organization whereas 238.223.156.208 and 239.223,156.208 may represent two computers on completely unrelated networks. FIG. 4 shows a generic ipv4 address with "x"'s indicating decimal digits of octets.

The first 1024 bytes of the cbf file consist of 256 4-byte pointers. These pointers represent the first octet of an ip address or level 1 as indicated in FIG. 3. If the pointer is 0xffffffff, all of the entries that begin with that octet should be treated as being on the master list. If the pointer is 0x00000000, no entry beginning with that octet is listed. In all other cases i.e. If the pointer value other than 0xffffffff or 0x00000000, the pointer indicates an offset within the binary file to a level 2 address section (the second octet). For example, if the level 1 address octet is 128 then the search within the file begins at byte 512 which is the location in the binary file at which the 4-byte pointer can be found that corresponds to the list status of the level 1 address octet. If all addresses in that network are on the list the 4-byte pointer starting at byte 512 will be ffffffff and the search can then terminate without looking at the level 2 and 3 address pointers. In this case the search returns a "true" result—i.e. The address is blacklisted. If no addresses in that network are listed then the 4-byte pointer starting at byte 512 will be 00000000, indicating that no addresses on that network are listed. The search then returns a "false" result—i.e. The address is not listed.

If however the pointer is any other value, this indicates that some addresses on this network are listed and some are not. The pointer directs the search to a second area of the file which contains an identical structure for the level 2 octet, again with the pointers indicating whether or not it is on the list. Note that generally the level 1 and level 2 octets specify networks which are assigned to larger organizations and that the two octets at level 3 may be assigned to smaller networks or to subnetworks (subnets). A subnet may exist within the context of a single company, organization or service.

Having examined level 2 octet, if the pointer at the referenced level 2 location is other than 0xffffffff or 0x00000000 then the search continues to level 3. The level 3 region is represented by a bitfield which consists of 65536 individual bits (each either a "1" or a "0"). The pointer obtained from level 2 points to the bitfield representing the last two octets. A bit value of "1" stored in the bitfield indicates that that address is listed and a bit value of "0" indicates that it is not listed.

The lookup algorithm for the cbf file format may be summarized as follows:

1. Read 1024 bytes of file and map to 256×4-byte header array;
2. Check the value at the position of the level 1 octet in the header array:
   if 0x00000000—IP is not listed—return false result.
   if 0xffffffff—IP is listed—return true result.
   else keep value and goto step 3;
3. Read 1024 bytes at offset from step 2 as 256×4-byte array (level 2 array)
4. Check the value at position of the second octet in the level 2 array:
   if 0x00000000—IP is not listed—return false result.
   if 0xffffffff—IP is listed—return true result.
   else keep value and goto step 5
5. Read 8192 bytes at offset from step 4 as final map
6. Convert last two octets (level 3) of address to an offset in the final map
7. Compare Bit In Final Map At Offset Calculated In Step 6:
   if 1—IP is blacklisted—return true result.
   if 0—IP is not blacklisted—return false result.

Advantageously where an entire network, as may be indicated by the first two address octets, has been blacklisted the search concludes after reading only 8 bytes. Even where only some addresses in a network have been blacklisted, the search proceeds through level 1 and level 2 (8-bytes read) and then ends with reading a further single byte for a total of 9 bytes read. In tests run on several lists the search time was on the order of 2 miliseconds.

Advantageously, the binary nature of the file allows very good compression. Using bzip2 utility a file built in the above format was compressed by a ratio of 25:1. Additionally this file format may be used to create multiple files; one for each blacklist source, when it is important to preserve the source of the lists and report multiple hits for a relatively small number of lists.

In a variation of the above file format embodiment, level 3 may be separated, such that the third octet is converted alone as level 3, and the final octet becomes a level 4, where level 3 is treated similar to level 1 and level 2, and level 4 is treated similar to the level 3 in the above embodiment.

Once the binary files have been constructed (either in the transitional format of the cbf format), user addresses may be looked up. It should be noted, that inclusion of one of the lists may equally well be representing 'whitelisting', rather than 'blacklisting'. In a whitelist, inclusion would indicate that the address or an address falling in an included range should be allowed access to a network resource. The lists may also be used to initiate other operations such as logging, redirecting or filtering, or any other action related to a network connection attempt.

If a user address is found to be listed the system may perform a variety of actions. In some cases, the program may perform the action, however normally, the lookup programs job is simply to indicate whether an ipv4 address is contained within one of the lists, and which list it is contained on. It is the job of the application that uses the list lookup result to perform the action based thereon.

Example 1

This example relates to protecting an operating system from attacks, worms, spam, and exploits. In the linux operating system, the kernel uses a system called 'iptables' to institute various firewall rules and conditional actions based on the type of network traffic it receives. At this level it has access to the originating ipv4 address of connections and network traffic. Normally, these rules are hard coded into the system via a ruleset, which needs to be initialized. New rules normally are entered manually, however 'iptables' has the ability to call user land tools, and as such a module can be written that performs these lookups.

These types of rule lookups must be extremely fast, and if they required another connection to a remote list, this extra overhead could quickly cause a denial of service attack. However, the operating system can easily perform high performance lookups against a large variety of lists using this new "bms" format. Based on whether an address was in a list, it could then drop the connection, forward the connection, slow the connection or perform some other action. Normally, the methodology is to have lists associated with conditional actions. In the examples above, lists are used that are expressly designed for "blacklist the ip address from sending smtp traffic to this server if it is on the list" however, a list of addresses could easily be made whose access to a particular service on this server (or server located behind it in the case of a firewall) depends on whether or not it is listed. Alternatively it could be a list of ip addresses that are allowed to connect to a voip phone. For example:

If Traffic Where Ip Is On List 28 Arrives, For Port 80 (Http), Redirect It To Server For Paid Members, Otherwise Redirect To A Signup Server If traffic where ip is on list 86 arrives, that is of voip type, give it precedence.

If traffic where ip is not on list 189 arrives, for udp then drop silently.

If traffic where ip is on list 1-20, where it is smtp, mark as spammer, log it, and redirect it to a tar pit.

If traffic where ip is not on list 211, then send an alarm to the security forces.

This is particularly important, as the volume of traffic precludes most type of external lookup systems, especially against multiple lists. All types of traffic monitoring, routing and control can be administered via lists in this format.

Example 2

This example relates to protecting a service via tcpwrapper/xinetd which is a common method in use to protect mail servers, and other server applications. A whitelist is frequently used to control who can relay traffic through a server, or who can send email to a server. Often these programs already have a mechanism to examine a blacklist and then disallow traffic from locations known to have sent spam. Although this tends to be an all or nothing solution, ie they can only affect a conditional rule based on ip address, it is simple to implement. However, each blacklist lookup takes time, and is subject to dos (denial of service) issues, when the rbl list server cannot be reached or if the server takes too long to respond. This is further complicated when multiple lists are involved and most implementations only use one or two lists. Additionally, if the service which reports on ip addresses changes format, the system may break, or worse, work in reverse of the intended behaviour. By instead using the mastering system in accordance with the present invention, these problems and others are alleviated.

Example 3

This example relates to protecting an instant messaging application. One of the problems facing light weight applications is that there is not enough information in the communication exchange to determine whether the traffic is wanted or unwanted. Administering a private allow/deny list of ipv4 addresses is difficult and a simple transparent way of stopping such traffic, especially in the case where such connections may involve a large number of lists or possible connecting addresses, is even more difficult. Instant messaging is also different in the sense that there are millions of peer to peer clients, and the volume is not conducive to looking up addresses from a single source over the network.

By employing the formats of the present invention, each client could download a master list and perform real time lookups against this. In compressed format, the lists of the present invention are relatively small, and may be downloaded on an hourly or daily basis. Instant message clients could then simply have a 'mark as spam' button which registers the ip address in a central database, which could then later be translated into the binary bitmap formats, and still allow for personal whitelists as well. Voip is also concerned about spammers and thus voip phones could be equipped with this same system.

There are many more examples and implications of this technology, basically anywhere an action is determined by the ip address or the existence of an entry in an ip address list, this system can offer advantages, especially where a large number of lists exist, or a large number of addresses exist on individual lists.

As will be apparent to those skilled in the art in light of the foregoing disclosure, many alterations and modifications are possible in the practice of this invention without departing from the spirit or scope thereof. Specifically, the system shown in FIG. 1 may be configured differently by combining or splitting functions performed by the various servers, varying connections etc. It should also be noted that using the methods of this invention there is no limit to the number of lists that can be incorporated. Additionally in the case where there is no need to preserve information concerning the source of a particular listed address entry there is no speed penalty in incorporating lists without limit. While the creation of the master lists has been described in terms of a transitional list format which is then written to disk storage in a final format, this is not mandated.

What is claimed is:

1. A method for controlling access to a network resource, the method comprising:
   reviewing at least one incoming electronic connection from an IP network address directed to the network resource;
   extracting a source IP network address from the incoming electronic connection;
   selecting a first grouping of leading bits of the source IP network address;
   performing a lookup of the first grouping of leading bits against a stored list of representations of IP network addresses, the stored list having a data structure for storage of said representations of IP network addresses as one or more pointers without storage of the IP network addresses themselves, wherein each pointer is associated with two or more IP network addresses;
   matching the first grouping of leading bits to a first pointer in the list representing all of the IP network addresses in the IP network address space having a grouping of leading bits identical to the first grouping of leading bits;
   if the first pointer points to one or more second pointers in the list:
   selecting a second grouping of leading bits of the source IP network address, the second grouping of bits being larger than the first grouping of leading bits;
   performing a lookup of the second grouping of leading bits against the list;
   matching the second grouping of leading bits to a second pointer in the one or more second pointers representing all of the IP network addresses in the IP network address space having a grouping of leading bits identical to the second grouping of leading bits;
   accepting or rejecting the incoming electronic connection depending on the value of the second pointer;
   otherwise, accepting or rejecting the incoming electronic connection depending on the value of the first pointer.

2. A method as defined in claim 1, wherein said incoming electronic connection is a message.

3. The method as defined in claim 1, wherein accepting or rejecting the incoming electronic connection depending on the value of the second pointer comprises:
   if the second pointer points to one or more third pointers in the list:
   selecting a third grouping of leading bits of the source IP network address, the third grouping of bits being larger than the second grouping of leading bits;
   performing a lookup of the third grouping of leading bits against the list;
   matching the third grouping of leading bits to a third pointer in the one or more third pointers that represents all of the IP network addresses in the IP network address space having a grouping of leading bits identical to the third grouping of leading bits;
   accepting or rejecting the incoming electronic connection depending on the value of the third pointer;
   otherwise, accepting or rejecting the incoming electronic connection depending on the value of the second pointer.

4. The method as defined in claim 1, wherein accepting or rejecting the incoming electronic connection depending on the value of the second pointer comprises:
   if the second pointer points to one or more third pointers in the list:
   selecting a grouping of leading bits of the source IP network address, the grouping of bits being larger than the second grouping of leading bits;
   iteratively performing the following until the incoming electronic connection is accepted or rejected:
   performing a lookup of the grouping of leading bits against the list;
   matching the grouping of leading bits to a pointer in the list representing all of the IP network addresses in the IP network address space having a grouping of leading bits identical to the grouping of leading bits;
   if the pointer points to one or more other pointers in the list, selecting a new grouping of leading bits of the source IP network address, the new grouping of bits being larger than the previous grouping of leading bits;
   otherwise, accepting or rejecting the incoming electronic connection depending on the value of the pointer.

5. The method as defined in claim 4, wherein the groupings of leading bits represented by the pointers and the groupings of leading bits selected from the source IP network address are multiples of an octet of bits.

* * * * *